April 15, 1952  H. E. VIOLET  2,592,981
TWO-WHEEL VEHICLE
Filed May 13, 1948  2 SHEETS—SHEET 1
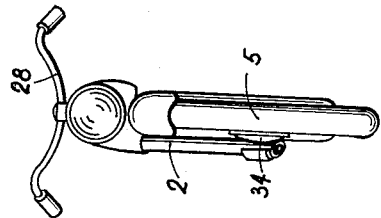
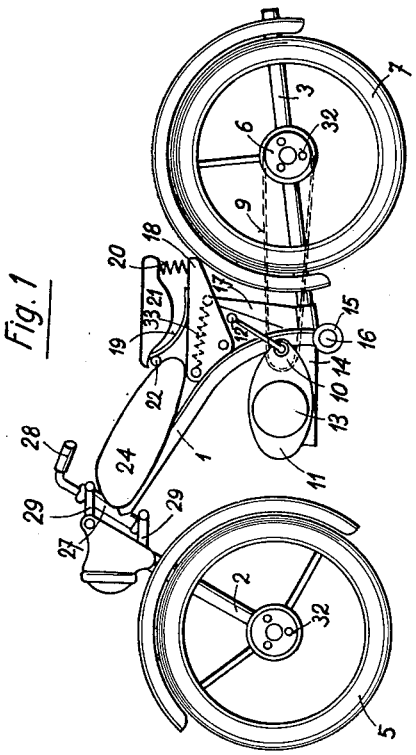
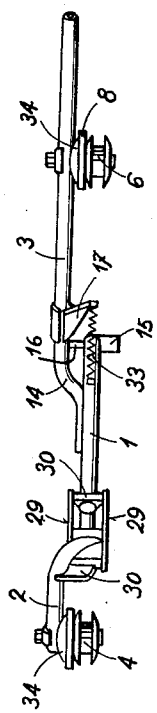
INVENTOR
HANS E. VIOLET,
BY
ATTORNEY April 15, 1952  H. E. VIOLET  2,592,981
TWO-WHEEL VEHICLE
Filed May 13, 1948  2 SHEETS—SHEET 2

INVENTOR
HANS E. VIOLET,
BY
ATTORNEY

Patented Apr. 15, 1952

2,592,981

UNITED STATES PATENT OFFICE 2,592,981

TWO-WHEEL VEHICLE

Hans Edouard Violet, Basel, Switzerland, assignor to Sotecom S. A., Geneva, Switzerland, a corporation of Switzerland Application May 13, 1948, Serial No. 26,897
In Switzerland May 16, 1947

2 Claims. (Cl. 180—32)

The two wheel vehicles such, for instance, as the motor bicycles do not yet achieve all possibilities in their present design and, in spite of their often complicated pattern, have numerous drawbacks.

The frames of the two wheel vehicles are all derived from those of the bicycles. Their design does not permit a quick change of the wheels and offers serious drawbacks whenever an elastic suspension of the rear wheel is wanted.

The present invention relates to a two wheel vehicle endeavouring to suppress these drawbacks by the fact that its frame includes a central part and two end parts which are laterally deflected and carrying, one a front wheel hub, the other a rear wheel hub fastened on one side only.

The attached drawing shows diagrammatically and by way of example a form of execution of the invention applied to a motor bicycle.

The Fig. 1 is a profile view of the motor bicycle.

The Fig. 2 is a view from above of the motor bicycle frame.

The Fig. 3 is a frontal view of the motor bicycle.

Figure 4:
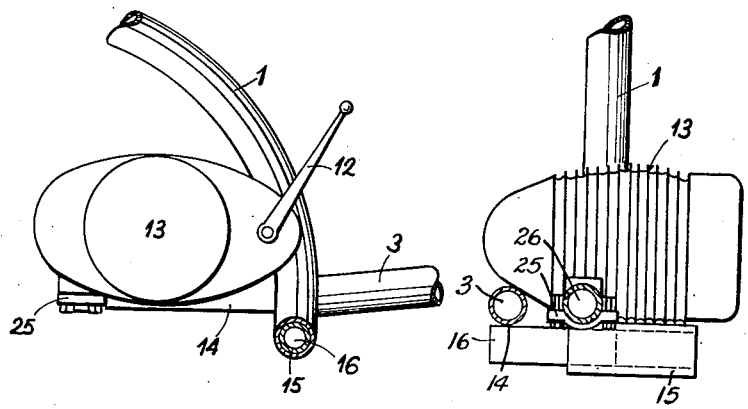
Figure 5:
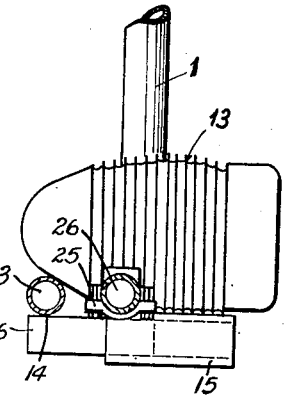

The Figs. 4 and 5 are part views at a greater scale showing the fastening of the motor.

Figure 6:
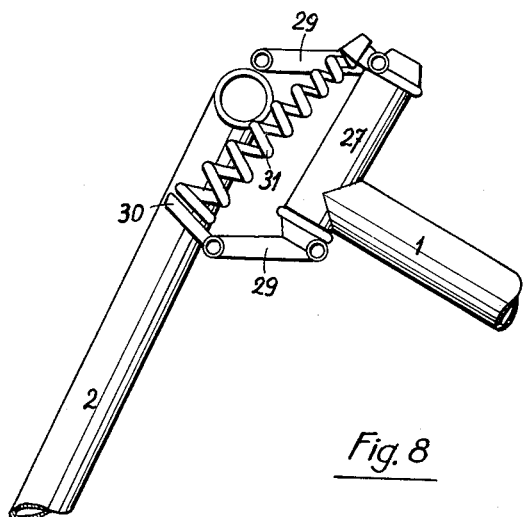
Figure 7:
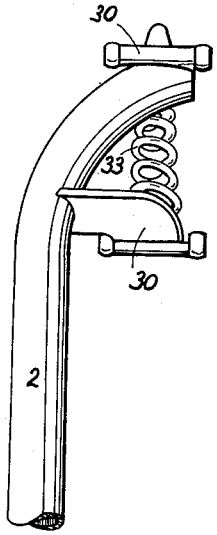

The Figs. 6 and 7 are part views at a greater scale showing the front suspension.

Figure 8:
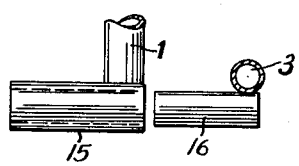

Fig. 8 is an exploded forward view showing the connection of the middle and rear frame parts.

The motor bicycle shown on the Figs. 1 to 3 of the attached drawing includes a frame having three parts, a central one 1, and two end parts 2 and 3. The two latter are laterally deflected with respect to the central part plane. The front part 2 carries a hub 4 for the front wheel 5 extending on one side, while the rear part 3 carries a hub 6 for the rear wheel 7 extending on one side. This hub 6 carries a cog wheel 8 on which passes the rear wheel driving chain 9. This chain 9 is driven by a cog wheel 10 pivoted in a casing 11 protecting a motor 13 and a gear box, the controlling organ 12 of which is only represented. This casing is fastened on an extension 14 of the rear part 3 of the frame. This extension is laterally deflected with respect to the rear part 3 so as to come in the plane of the central part 1. The rear part is articulated on the rear end of the central part 1. For this purpose, the latter carries a tube 15 of which the axis is perpendicular with the central part plane. This tube constitutes a bearing for an axle 16 fastened to the rear part 3 and extending laterally with respect to the latter. The axle 16 is parallel with the hub 6 of the rear wheel 7. This rear part 3 also carries an arm 17 of which the end is linked by a spring 33 to a support 18 rigidly fixed to the central part 1. Suspension springs 19 and 20 of a saddle 21 rest on this support 18. The saddle 21 is articulated at its front end along an axis 22 parallel with the hubs 4 and 6, on an element 24 fastened to the central part 1. This element 24 is constituted, in the motor bicycle represented by way of example, by a liquid fuel tank connected by a piping (not represented) to the carburettor (not represented) of the motor 13. The latter includes a part 26 which is fastened on the extension 14 by means of a flange 25. The rear part of the frame, as well as the extension 14 is formed by a single tube, the inside hollow of which is linked to the exhaust manifold, so that this rear part constitutes simultaneously:

(1) The rear wheel support,
(2) The motor support,
(3) The silencer.

The central part 1 is constituted by a tube inclined from the front towards the rear and carrying at one of its ends the tube 15 and at its other end a tube 27 situated in the plane of the tube 1 and intended to receive the handle bar 28. On the handle bar support tube are articulated small rods 29, articulated at their other end on the front part 2. The latter includes a tube bent at its upper end in order to deflect it laterally. This tube carries the hub 4 and two supports 30 on which are articulated the small rods 29. Finally, a spring 31 elastically connects the parts 1 and 2 between themselves.

From above description and by examining the attached drawing, it is easy to realize the great simplicity of design of a two wheel vehicle frame and the great advantages offered by this new design. Indeed, one of the lateral sides of the front and rear wheel is entirely free, the wheels being fixed to a hub supported by only one of its ends. It follows that the front and rear wheels can be attached in a removable way to their hub, for instance, by means of three bolts or nuts 32, or in accordance with one of the numerous removable fastening devices for vehicle wheels in use for many years for automobile wheels for instance. Changing the wheels is therefore far much quicker than changing the wheels of the motor bicycles known at the present time, in which each wheel is imprisoned between two parts of a fork. Moreover, with the two wheel vehicle in accordance with the invention, the rear wheel driving cog is mounted on the hub of the rear wheel which remains fastened to the rear part 3 of the frame when the rear wheel is removed. It follows that this chain remains in its position during the removing of the rear wheel, which greatly simplifies this removing and particularly the replacing of the rear wheel.

In spite of the elastic suspension of the rear wheel, the distance between the two cog wheels 8 and 10 remains always the same, because the motor and the gear box carrying the cog wheel 8 are fixed on the extension 14 which is fastened to the rear part 3 which carries the cog wheel 10.

In addition to all these advantages, there still is the fact that the cost price of the described two wheel vehicle is much lower than that of the present vehicles of the same kind, for the frame is not only of a much simpler design, but it is possible to standardize to the utmost all its parts and constitutive elements. Thus, the front and rear hubs can be exactly alike, as well as the front and rear wheels which then become interchangeable.

In an alternative design, the rear part 3 could be fastened to the central part 1. In this case, the spring 33 may be omitted. One could also lengthen the tube 15 on both sides, these extensions becoming thus able to provide foot rests. The front part 2 could be deflected laterally on one side of the central part 1 and the rear part 3 on the opposite side of this central part.

As diagrammatically shown on the drawing, Figs. 1 to 3, the tubes forming the parts 1 and 3 of the frame are partly surrounded by covers 34 carrying the brake blocks (not represented). For this purpose, the two covers 34 have an embossing of shape corresponding to the tubes forming the parts 1 and 3 of the frame. Thus, these covers are resting on the tubes, so that this design permits an extremely simple and efficient way of providing brake cover fastenings, these covers being subjected to strong axial pushes and torques.

A form of execution of the two wheel vehicle which is the object of the invention has been described above by way of example and with reference to the attached diagrammatical drawing, but it is obvious that this realization can be designed in a different way as regards the construction details, and adapted to the various types of two wheel vehicles, such as bicycles.

I claim:

1. A frame for motor cycles, comprising, a central member disposed in a single vertical plane and declining rearwardly and carrying at its lower rear end a journal extending horizontally, a handle bar support journalled in the front end of the central member, upper and lower pairs of rods each pair pivoted at corresponding ends to one end of the handle bar support, a front member having an upper portion connected to the other corresponding ends of the pairs of rods and having a lower portion disposed in a plane parallel to said first plane, spring means reacting against the upper end of the handle bar support and the front member and urging the front end of the central member upwardly, a rear member, an axle rigid with the rear member and extending at right angles and horizontally from the rear member and journalled in the journal of the central member for swinging in a vertical plane, the rear member including an arm disposed rearwardly of the axle and in a plane parallel to said first plane, and also including a second arm disposed forwardly of the axle and partly in a plane parallel to said first plane and having its front end disposed in said first plane, second spring means connecting the central member to the rear member and urging the former to a predetermined angular relation to the rear member, and wheel mounting means each carried respectively by the lower end of the front member and the rear end of the rear member and extending at right angles therefrom.

2. A frame for motor cycles, according to claim 1, in combination with a motor supplied on the front end of the forward arm of the rear member and disposed in said first plane.

HANS EDOUARD VIOLET.

REFERENCES CITED

The following references are of record in the file of this patent:

UNITED STATES PATENTS

| Number | Name | Date |
|---|---|---|
| 1,306,995 | Bradshaw | June 17, 1919 |
| 1,576,216 | Phillips | Mar. 9, 1926 |
| 2,082,147 | Bryant | June 1, 1937 |
| 2,258,449 | Grabach | Oct. 7, 1941 |
| 2,377,389 | Waters | June 5, 1945 |

FOREIGN PATENTS

| Number | Country | Date |
|---|---|---|
| 425 | Great Britain | 1907 |
| 202,170 | Great Britain | Aug. 16, 1923 |
| 255,026 | Italy | Oct. 4, 1927 |
| 387,550 | Great Britain | Feb. 9, 1933 |